Feb. 16, 1965  M. E. BOWEN  3,169,525
PRESSURIZED MEDICAMENT CONTAINER WITH EASILY ATTACHABLE
DOSE MEASURING DISPENSING PROBE
Filed April 7, 1961  2 Sheets-Sheet 2
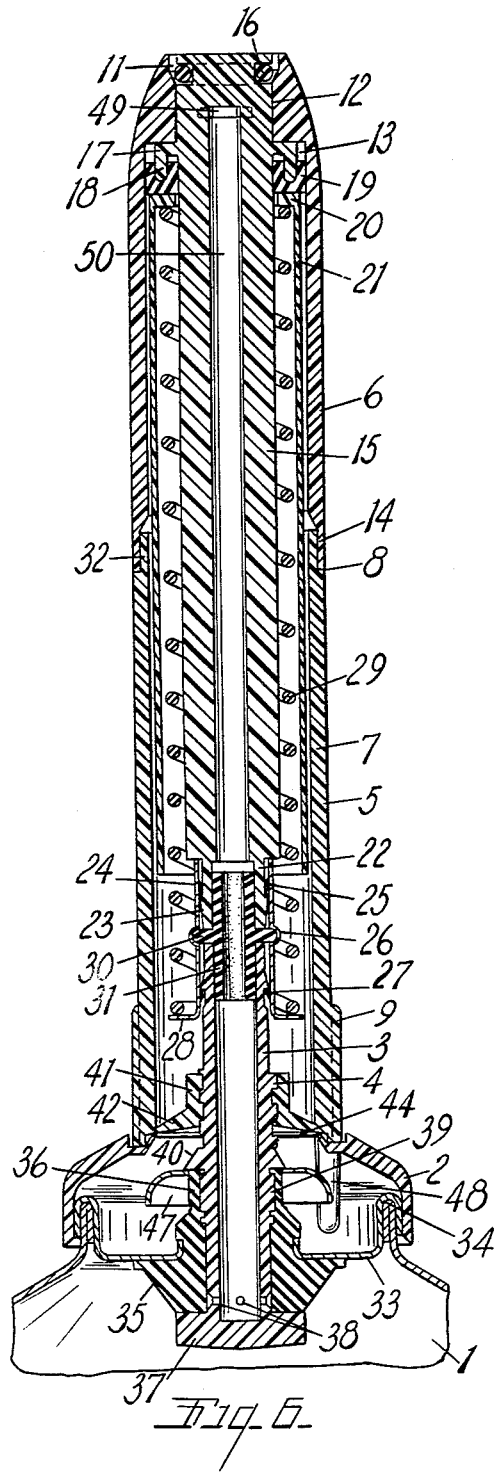
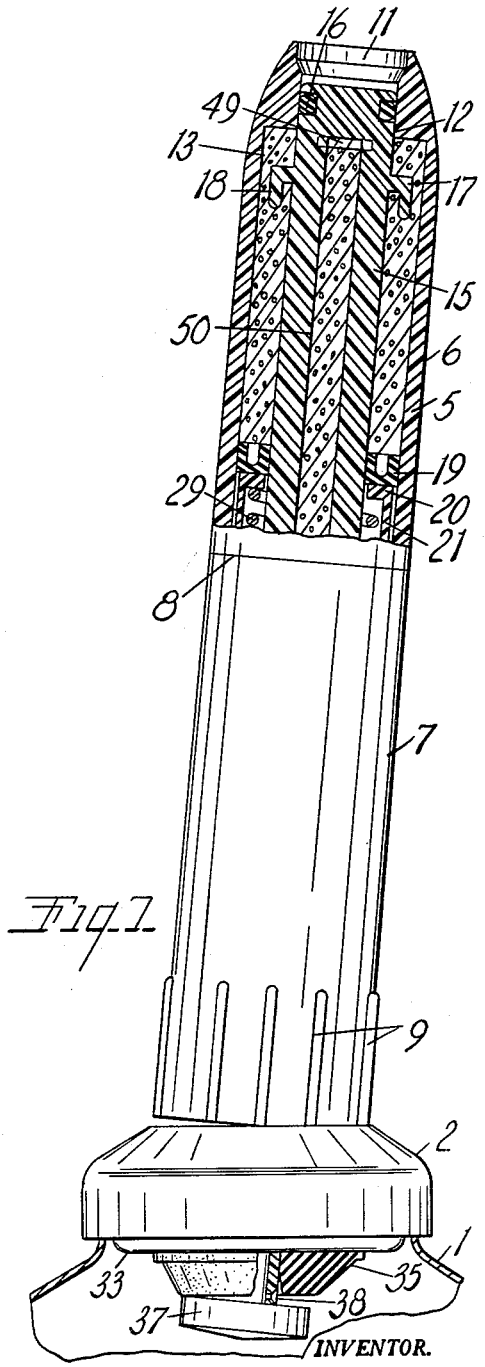
INVENTOR.
Max E. Bowen
BY
Otto A. Earl
ATTORNEY

United States Patent Office 3,169,525
Patented Feb. 16, 1965

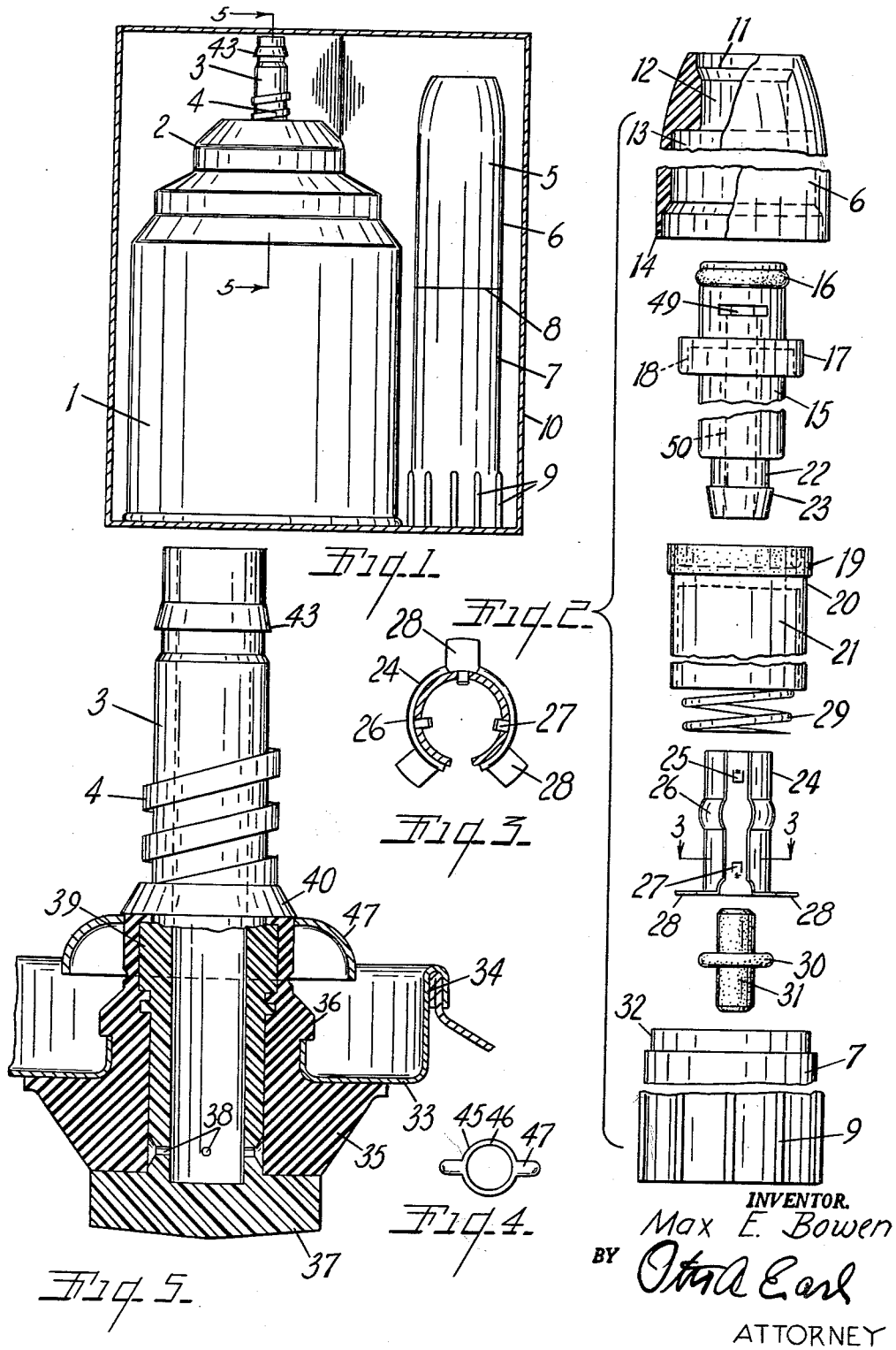

3,169,525
PRESSURIZED MEDICAMENT CONTAINER WITH EASILY ATTACHABLE DOSE MEASURING DISPENSING PROBE
Max E. Bowen, 49230 W. 14 Mile Road, Wixom, Mich.
Filed Apr. 7, 1961, Ser. No. 101,541
10 Claims. (Cl. 128—184)

This invention relates to improvements in pressurized medicament container with easily attachable dose measuring dispensing probe. The principal objects of this invention are:

First, to provide a pressurized container for a medicament with a tubular discharge nozzle and valve which tilts to release the contents of the container and an elongated dose measuring dispensing probe which is easily attachable to the nozzle so that the container and probe can be packed side by side in a small package for shipment and easily assembled by the purchaser for use.

Second, to provide a novel type of easily engaged connections between a dispensing probe and a discharge nozzle of a container in which a pressure tight seal is provided at the connection at the end of the nozzle which cannot be removed once the connection has been made so that the assembled probe and container must be discarded when the container is empty.

Third, to provide a novel combination of a tiltable discharge nozzle on a pressurized container with a tubular nozzle extension and a surrounding dispensing probe threadedly engaged with the container nozzle to alternatively open a discharge opening in the end of the probe or seal the end of the probe to the nozzle extension with an opening communicating between the nozzle extension and the interior of the probe to introduce a measured dose of the medicament into the probe.

Fourth, to provide a combined dose measuring and dispensing probe for a pressurized container of a medicament which prevents direct communication between the container and the discharge end of the probe and which prevents contamination of the interior of the probe and the contents of the container.

Other objects and advantages of the invention will be apparent from a consideration of the following description and claims. The drawings, of which there are two sheets, illustrate a highly practical form of the measuring and dispensing probe and its connection to a pressurized container.

FIG. 1 is a side elevational view of the container and probe as they may be packed for shipment, a container being shown conventionally in cross section.

FIG. 2 is a fragmentary exploded elevational view of the elements of the probe as they will be pre-assembled for packaging with the container.

FIG. 3 is a cross sectional view through the coupling member and the nozzle tube extension taken along the plane of the line 3—3 of FIG. 2.

FIG. 4 is a top plan view of an anti-rotation band applied to the stem of the pressurized container.

FIG. 5 is a fragmentary longitudinal cross sectional view through the valve and discharge nozzle of the container taken along the plane of the line 5—5 in FIG. 1 and illustrating the position of the anti-rotation band shown in FIG. 4.

FIG. 6 is a fragmentary longitudinal cross sectional view through the dispensing probe as mounted on the container with the valve in closed position and with the dose dispensing elements of the probe in the fully extended position they will occupy after dispensing a dose of the medicament.

FIG. 7 is a fragmentary enlarged longitudinal cross sectional view through the probe and valve assembly with the probe and valve tilted in the position they will assume for introducing a dose of the medicament into the probe.

As is shown generally in FIG. 1 the invention comprises a cylindrical can or container 1 adapted to be filled with a suitable medicament under pressure. The top of the container 1 carries an apertured cap 2 through which the tubular discharge nozzle stem 3 extends from valve mechanism to be described. The exterior of the stem 3 is provided with a high pitch thread 4 for connection to the dispensing probe 5 as will be described. The probe itself consists of an outer end portion 6 and an inner end portion 7 permanently joined together along the joint line 8. The inner end of the inner section 7 is desirably provided with ribs or serrations 9 by means of which the probe can be easily rotated on the threads 4. By reason of the easily attachable connection between the probe 5 and nozzle stem 3 which will be described in detail presently, it is expedient to package the container and probe in separate side by side relation in a box 10 for economy of space during storage and shipment.

The details of construction of the probe 5 appear more clearly in FIGS. 2 and 6. The outer end portion 6 of the probe has a rounded or tapered outer discharge end with an inwardly tapering discharge opening 11 in its outer end merging with a short bore 12. The bore 12 in turn opens to a larger cylindrical dose cavity 13 which extends downwardly or inwardly to the enlarged coupling flange 14 on the inner end of the outer portion of the probe.

The outer portion 6 of the probe is sized to receive a hollow tubular nozzle stem extension 15 having an O-ring seal 16 at its outer end designed to fit slidably within the bore 12 and in some instances to project into the tapered discharge opening 11 as appears in FIG. 6. Within the enlarged dose chamber 13 in the outer probe member, the stem extension 15 is provided with a radially projecting collar 17 with an inwardly facing abutment flange 18. The flange 18 fits within and seals against the outwardly facing annular U-shaped flexible piston and seal 19 mounted on the outer end of a relatively rigid cylindrical piston 20. The piston 20 slides freely in the space between the stem extension and the outer probe member, but the flexible piston 19 forms a sliding seal between these members. The inner end of the rigid piston 20 includes an elongated cylindrical skirt 21 adapted to abut against the bottom of the probe to limit downward movement of the piston and thus predetermine the size of the dose which can be introduced into the dose chamber 13. As appears more clearly in FIG. 6 the tubular stem extension is long enough to project through the skirt 21 of the rigid piston and at its lower or inner end is reduced in external diameter as at 22 with a tapered end forming an outwardly facing shoulder or catch 23.

The reduced portion 22 and the catch 23 of the stem extension coact with the outer end of a generally cylindrical but axially split spring metal coupling 24 having radially and axially inwardly facing spring catch ears 25 struck from its sides. The coupling 24 slips axially over the reduced portion 22 and the ears 25 snap behind the catch 23 to irremovably connect the coupling to the extension. Inwardly of the ears 25 the coupling 24 is provided with an annular outwardly flared rib 26 and below the rib 26 there is a lower cylindrical end with upwardly or outwardly facing spring catch ears 27 formed in the side walls of the coupling. At its lower end the coupling 24 is provided with three radially outwardly turned flanges 28. The flanges 28 form abutments for the lower end of a piston spring 29 and when the coupling 24 is pressed upwardly or outwardly onto the inner end of the stem extension, the spring 29 forces the rigid piston 20 and the flexible piston 19 upwardly or outwardly against the stop or shoulder 17 on the stem extension.

The annular rib 26 on the coupling receives and retains an annular bead or rib 30 formed around the center of a flexible tubular seal 31 so that the upper end of the seal is received and retained within the lower end 22 of the nozzle stem extension 15. After the spring, nozzle stem extension, coupling, and piston elements are assembled in the outer end portion 6 of the probe, the inner portion 7 of the probe is assembled axially over the coupling 24 until a reduced outer end 32 fits telescopically within the end 14 on the outer portion of the probe and the two portions of the probe are permanently joined together by fusion or adhesion. The probe portions 6 and 7 are desirably formed of clear plastic so that the inner portions and particularly the flexible piston 19 are clearly visible through the wall of the probe. Desirably the rigid piston 20 and its skirt 21 are of dark or contrasting color so that the position of the piston can be viewed.

The stem or nozzle 3 which forms a part of the valve in the container 1 is more clearly illustrated in FIGS. 5 and 6 where it will be noted that the container 1 includes a top wall 33 with a hole in the center. The top wall 33 is seamed to body of the can 1 at 34 and the cover 2 which may be of molded plastic is snapped over the seamed joint. A rubber or other deformable collar 35 seats against the underside of the top wall 33 with a neck 36 projecting upwardly thereabove. The tubular discharge stem 3 projects through the neck 36 to a circular valve head 37 on the inner end of the valve stem. The valve stem 3 is hollow and provided with radial ports 38 which open to the interior of the container when the stem is tilted in any direction. Desirably the outer side of the stem 3 is ribbed or serrated as at 39 to non-rotatably engage the neck 36 of the rubber collar 35. The assembly of the tubular valve stem 3, valve head 37 and rubber collar 35 in the top wall 33 is an old type of valve and nozzle assembly for pressurized containers but the non-rotational engagement provided by the ribs 39 is believed to be new.

The neck 36 of the collar 35 is pressed axially against a tapered shoulder 40 on the stem 3 below the screw threads 4. The threads 4 receive and coact with internal threads formed in a boss 41 formed on the bottom end wall 42 of the inner probe section 7. By threading the boss 41 downwardly over the end of the stem 3, the catches 27 on the coupling engage with annular beveled shoulder 43 on the upper end of the valve stem 3. The shoulders 23 and 43 form locking notches that coact axially with the catches 25 and 27. The tubular flexible coupling 31 projects into the tubular stem 3 and the rib 30 on the coupling is clamped between the adjacent ends of the nozzle stem 3 and the stem extension 15 to form a fluid and pressure tight seal between the two tubes.

The cover 2 has an upwardly facing annular shoulder or seat 44 adapted to support the inner end 7 of the probe when the probe is retracted or threaded inwardly on the threads 4. In this position of the outer cylindrical probe neither the probe nor the valve stem can be tilted relative to the container 1 and it is impossible to release any of the contents of the container into the dose chamber. By rotating the probe outwardly on the thread 4 as shown in FIG. 7 both the probe and the tubular valve stem can be tilted to release the contents of the container into the tubular stem and stem extension. In order to facilitate initial assembly of the probe 5 and particularly the threaded boss 41 thereof on the threads of the valve stem the valve stem is restrained against rotation in the container and the rubber collar 35 by means of a non-rotating lock band 45, the details of which are shown in FIGS. 4 and 5.

The band is a stamped metallic element having a tapered body 46 with radially projecting arms 47 of U-shaped cross section. Prior to assembling the probe on the container valve stem, the non-rotating collar is pressed over the tapered cone 40 on the stem and contracted into the rubber of the neck 36 by pressing the sides of the ears 47 together. The ears 47 project into the path or position of a depending lug 48 on the underside of the cover 2. The valve stem 3 is restrained against rotation in the neck 36 by the ribs 39 and the rubber neck 36 is restrained against rotation on the container by engagement of the ears 47 with the pin 48 as the probe is threaded upwardly and downwardly on the threads 4.

As appears more clearly from a comparison of FIGS. 6 and 7 no pressure can escape from the container 1 when the probe is retracted or threaded inwardly on the threads 4 against the seat 44. At the same time the O-ring seal 16 on the outer end of the discharge tube extension is positioned in the tapered portion 11 of the discharge opening and the shoulder 17 on the tube extension is abutted against the inwardly facing end of the dose chamber 13. If now the probe is threaded outwardly as in FIG. 7 and tilted the O-ring seal is retracted relatively into the reduced bore 12 in the end of the probe and radially opening ports 49 which communicate between the outer end of the bore 50 in the stem extension are exposed within the dose chamber 13. Under these conditions the pressure in the container 1 will force a dose of the medicament into the dose chamber 13 and the pistons 19 and 20 will be depressed or retracted against the pressure of the spring 29 until the skirt on the piston engages the bottom wall 42 of the probe. At this time the dose in the dose chamber will be full pressure of the container 1 but none of the medicament can be discharged due to the position of the O-ring seal in the bore 12. Before the dose of medicament can be released or applied the probe 5 must be returned to upright position which automatically closes valve 37 leaving the dose in the dose chamber isolated from the pressure in the container. If then the probe is retracted by threading it inwardly or downwardly on the threads 4, the O-ring seal 16 moves into the beveled discharge opening 11 permitting the dose to be discharged under the pressure built up in the dose chamber and the pressure of the spring 29. Since the first increment of expansion of the dose material rapidly relieves the pressure in the dose chamber, the medicament is directed under a positive but perfectly safe pressure and the full charge of the dose is delivered by the action of the spring 29.

It will be noted that when the probe is retracted to open the discharge opening the inner end of the probe abuts against the seat 44 on the cover thus preventing simultaneous opening of the valve 37 and the discharge opening 11. The contents of the container are confined at all times either within the container itself or the interior of the discharge stem and the discharge stem extension so no contamination of the contents is possible.

What is claimed as new is:

1. A pressurized medicament container with tiltable discharge valve and an elongated dose measuring and dispensing probe adapted to be non-removably connected to the stem of the valve by the user comprising a rubber collar in the end of said container, a hollow stem on said valve extending through said collar from the inside to the outside of the container, a cap on said container forming an annular seat surrounding the outer end of said stem, a stud on the inside of said cap disposed alongside said stem, an annular ring non-rotatably engaged between said stem and said stud, a thread on the outer end of said stem from said ring, a hollow cylindrical probe and dose chamber having an end wall threadedly engaged with the thread on said stem, the inner end of said probe seating on said seat on said cap to prevent tilting of the stem and probe when the probe is threadingly retracted inwardly on said thread, the outer end of said probe defining a cylindrical bore of reduced size with an outwardly flared outer end forming a discharge opening, a hollow cylindrical stem extension non-removably connected to the outer end of said stem and projecting into said bore in the end of said probe, an O-ring seal on said extension positioned to lie in said bore when said probe is extended on said thread and to be projected into said flared portion of the bore when said probe is retracted, a flexible annular piston slidingly engaged between said extension and the inside of said probe, a coil spring compressed between said piston and said stem and urging the piston outwardly in said probe, a stop on said extension limiting outward movement of said piston short of the outer end of said probe, a rigid piston backing up said flexible piston and having an elongated skirt engageable with the inner end of said probe to define the size of said dose chamber, and a port formed in the wall of said extension from the hollow inside to outside thereof to open into said dose chamber at the outer side of said piston when said probe is extended on said thread, said stem extension being connected axially on the end of said stem by an axially split generally cylindrical spring metal connector having opposed catches engaged in locking notches provided therefor in the stem and stem extension, and a flexible tubular seal positioned within and extending between the ends of said stem and said stem extension with an exterior flexible flange engaged between the ends of said stem and stem extension and retained in place by said connector, said connector having outwardly extending lugs on one end forming abutments for the inner end of said spring.

2. A pressurized medicament container with tiltable discharge valve and an elongated dose measuring and dispensing probe adapted to be non-removably connected to the stem of the valve by the user comprising a rubber collar in the end of said container, a hollow stem on said valve extending through said collar from the inside to the outside of the container, a cap on said container forming an annular seat surrounding the outer end of said stem, a stud on the inside of said cap disposed alongside said stem, an annular ring non-rotatably engaged between said stem and said stud, a thread on the outer end of said stem from said ring, a hollow cylindrical probe and dose chamber having an end wall threadedly engaged with the thread on said stem, the inner end of said probe seating on said seat on said cap to prevent tilting of the stem and probe when the probe is threadingly retracted inwardly on said thread, the outer end of said probe defining a cylindrical bore of reduced size with an outwardly flared outer end forming a discharge opening, a hollow cylindrical stem extension non-removably connected to the outer end of said stem and projecting into said bore in the end of said probe, an O-ring seal on said extension positioned to lie in said bore when said probe is extended on said thread and to be projected into said flared portion of the bore when said probe is retracted, a flexible annular piston slidingly engaged between said extension and the inside of said probe, a coil spring compressed between said piston and said stem and urging the piston outwardly in said probe, a rigid piston backing up said flexible piston, and port formed in the wall of said extension from the hollow inside to outside thereof to open into said dose chamber at the outer side of said piston when said probe is extended on said thread, said stem extension being connected axially on the end of said stem by an axially split generally cylindrical spring metal connector having opposed catches engaged in locking notches provided therefor in the stem and stem extension, and a flexible tubular seal positioned within and extending between the ends of said stem and said stem extension with an exterior flexible flange engaged between the ends of said stem and stem extension and retained in place by said connector.

3. A pressurized medicament container with tiltable discharge valve and an elongated dose measuring and dispensing probe adapted to the non-removably connected to the stem of the valve by the user comprising a flexible collar in the end of said container, a hollow stem on said valve extending through said collar from the inside to the outside of the container, means forming a non-rotative connection between said stem and said collar, a cap on said container forming an annular seat surrounding the outer end of said stem, a stud on the inside of said cap disposed alongside said stem, an annular ring non-rotatably engaged between said stem and said stud, a thread on the outer end of said stem from said ring, a hollow cylindrical probe and dose chamber having an end wall threadedly engaged with the thread on said stem, the inner end of said probe seating on said seat on said cap to prevent tilting of the stem and probe when the probe is threadingly retracted inwardly on said thread, the outer end of said probe defining a cylindrical bore of reduced size forming a discharge opening, a hollow cylindrical stem extension non-removably connected to the outer end of said stem and projecting into said bore in the end of said probe, an O-ring seal on said extension positioned to lie in said bore when said probe is extended on said thread and to be projected from the bore when said probe is retracted, a flexible annular piston slidingly engaged between said extension and the inside of said probe, a coil spring compressed between said piston and said stem and urging the piston outwardly in said probe, a rigid piston backing up said flexible piston, and a port formed in the wall of said extension from the hollow inside to outside thereof to open into said dose chamber at the outer side of said piston when said probe is extended on said thread, said stem extension being connected axially on the end of said stem by a spring metal connector having opposed catches engaged in locking notches provided therefor in the stem and stem extension, and a flexible tubular seal positioned within and extending between the ends of said stem and said stem extension with an exterior flexible flange engaged between the ends of said stem and stem extension and retained in place by said connector.

4. A pressurized medicament container with tiltable discharge valve and an elongated dose measuring and dispensing probe adapted to be non-removably connected to the stem of the valve by the user comprising a flexible collar in the end of said container, a hollow stem on said valve extending through said collar from the inside to the outside of the container, means forming a non-rotative connection between said stem and said collar, a cap on said container forming an annular seat surrounding the outer end of said stem, a thread on the outer end of said stem, a hollow cylindrical probe and dose chamber having an end wall threadedly engaged with the thread on said stem, the inner end of said probe seating on said seat on said cap to prevent tilting of the stem and probe when the probe is threadingly retracted inwardly on said thread, the outer end of said probe defining a cylindrical bore forming a discharge opening, a hollow cylindrical stem extension non-removably connected to the outer end of said stem and projecting into said bore in the end of said probe, an O-ring seal on said extension positioned to lie in said bore when said probe is extended on said thread and to be projected from the bore when said probe is retracted, a flexible annular piston slidingly engaged between said extension and the inside of said probe, a coil spring compressed between said piston and said stem and urging the piston outwardly in said probe, and a port formed in the wall of the said extension from the hollow inside to outside thereof to open into said dose chamber at the outer side of said piston when said probe is extended on said thread, said stem extension being connected axially on the end of said stem by a connector having opposed catches engaged in locking notches provided therefor in the stem and stem extension, and a flexible tubular seal positioned within and extending between the ends of said stem and said stem extension with an exterior flexible flange engaged between the ends of said stem and stem extension and retained in place by said connector.

5. A pressurized medicament contained with tiltable discharge valve and separate elongated dose measuring and dispensing probe non-removably connected to the stem of the valve comprising a rubber collar in the end of said container, a hollow stem on said valve extending through said collar from the inside to the outside of the container, means forming a non-rotative connection between said stem and said collar, a cap on said container forming an annular seat surrounding the outer end of said stem, a thread on the outer end of said stem, a hollow cylindrical probe and dose chamber having an end wall threadedly engaged with the thread on said stem, the inner end of said probe seating on said seat on said cap to prevent tilting of the stem and probe when the probe is threadingly retracted inwardly on said thread, the outer end of said probe defining a cylindrical bore forming a discharge opening, a hollow cylindrical stem extension non-removably connected to the outer end of said stem and projecting into said bore in the end of said probe, an O-ring seal between said extension and said bore when said probe is extended on said thread, means to break said seal when said probe is retracted, an annular piston slidingly engaged between said extension and the inside of said probe, a coil spring compressed between said piston and said stem and urging the piston outwardly in said probe, an annular stop forming a seat on said extension engaged by said piston on outward movement of said piston, an elongated skirt on said piston engageable with the inner end of said probe to define the size of said dose chamber, and a port formed in the wall of said extension from the hollow inside to outside thereof to open into said dose chamber at the outer side of said piston when said probe is extended on said thread, said stem extension being connected axially on the end of said stem by an axially slidably generally cylindrical connector having opposed catches non-removably engaged in locking notches provided therefor in the stem and stem extension, and a flexible tubular seal positioned within and extending between the ends of said stem and said stem extension with an exterior flexible flange engaged between the ends of said stem and stem extension and retained in place by said connector, said connector having outwardly extending lugs on one end forming abutments for the inner end of said spring.

6. A pressurized medicament container with tiltable discharge valve and separate elongated dose measuring and dispensing probe non-removably connected to the stem of the valve comprising a rubber collar in the end of said container, a hollow stem on said valve extending through said collar from the inside to the outside of the container, means forming a non-rotative connection between said stem and said collar, a cap on said container forming an annular seat surrounding the outer end of said stem, a thread on the outer end of said stem, a hollow cylindrical probe and dose chamber having an end wall threadedly engaged with the thread on said stem, the inner end of said probe seating on said seat on said cap to prevent tilting of the stem and probe when the probe is threadingly retracted inwardly on said thread, the outer end of said probe defining a cylindrical bore forming a discharge opening, a hollow cylindrical stem extension non-removably connected to the outer end of said stem and projecting into said bore in the end of said probe, an O-ring seal between said extension and said bore when said probe is extended on said thread, means to break said seal when said probe is retracted, an annular piston slidingly engaged between said extension and the inside of said probe, a coil spring compressed between said piston and said stem and urging the piston outwardly in said probe, an annular stop forming a seat on said extension engaged by said piston on outward movement of said piston, and a port formed in the wall of said extension from the hollow inside to outside thereof to open into said dose chamber at the outer side of said piston when said probe is extended on said thread, said stem extension being connected axially on the end of said stem by an axially slidably generally cylindrical connector having opposed catches non-removably engaged in locking notches provided therefor in the stem and stem extension, and a flexible tubular seal positioned within and extending between the ends of said stem and said stem extension.

7. A pressurized medicament container with tiltable discharge valve and separate elongated dose measuring and dispensing probe non-removably connected to the stem of the valve comprising a hollow stem on said valve extending from the inside to the outside of the container, a cap on said container forming an annular seat surrounding the outer end of said stem, a thread on the outer end of said stem, a hollow cylindrical probe and dose chamber having an end wall threadedly engaged with the thread on said stem, the inner end of said probe seating on said seat on said cap to prevent tilting of the stem and probe when the probe is threadingly retracted inwardly on said thread, the outer end of said probe defining a cylindrical bore with an outer end forming a discharge opening, a hollow cylindrical stem extension non-removably connected to the outer end of said stem and projecting into said bore in the end of said probe, means forming a seal between said extension and said bore when said probe is extended on said thread, said seal means being arranged to break the seal in the bore when said probe is retracted, an annular piston slidingly engaged between said extension and the inside of said probe, a coil spring compressed between said piston and said stem and urging the piston outwardly in said probe, and a port formed in the wall of said extension from the hollow inside to outside thereof to open into said dose chamber at the outer side of said piston when said probe is extended on said thread, said stem extension being connected axially on the end of said stem by an axially engageable generally cylindrical spring metal connector embracing the adjacent ends of the stem and stem extension, and a flexible tubular seal positioned within and extending between the ends of said stem and said stem extension with an exterior flexible flange engaged between the ends of said stem and stem extension and retained in place by said connector, said connector having outwardly extending lugs on one end forming abutments for the inner end of said spring.

8. A pressurized medicament container with tiltable discharge valve and separate elongated dose measuring and dispensing probe non-removably connected to the stem of the valve comprising a hollow stem on said valve extending from the inside to the outside of the container, a cap on said container forming an annular seat surrounding the outer end of said stem, a thread on the outer end of said stem, a hollow cylindrical probe and dose chamber having an end wall threadedly engaged with the thread on said stem, the inner end of said probe seating on said seat on said cap to prevent tilting of the stem and probe when the probe is threadingly retracted inwardly on said thread, the outer end of said probe defining a cylindrical bore with an outer end forming a discharge opening, a hollow cylindrical stem extension non-removably connected to the outer end of said stem and projecting into said bore in the end of said probe, means forming a seal between said extension and said bore when said probe is extended on said thread, said seal means being arranged to break the seal in the bore when said probe is retracted, an annular piston slidingly engaged between said extension and the inside of said probe, a coil spring compressed between said piston and said stem and urging the piston outwardly in said probe, and a port formed in the wall of said extension from the hollow inside to outside thereof to open into said dose chamber at the outer side of said piston when said probe is extended on said thread, said stem extension being connected axially on the end of said stem by an axially engageable generally cylindrical connector embracing the adjacent ends of the stem and stem extension, and a flexible tubular seal positioned within and extending between the ends of said stem and said stem extension, with an exterior flexible flange engaged between the ends of said stem and stem extension and retained in place by said connector.

9. A pressurized medicament container with tiltable discharge valve and separate elongated dose measuring and dispensing probe non-removably connected to the stem of the valve comprising, a hollow stem on said valve extending from the inside to the outside of the container, a cap on said container forming an annular seat surrounding the outer end of said stem, a thread on the outer end of said stem, a hollow cylindrical probe and dose chamber having an end wall threadedly engaged with the thread on said stem, the inner end of said probe seating on said seat on said cap to prevent tilting of the stem and probe when the probe is threadingly retracted inwardly on said thread, the outer end of said probe defining a cylindrical bore with an outer end forming a discharge opening, a hollow cylindrical stem extension non-removably connected to the outer end of said stem and projecting into said bore in the end of said probe, means forming a seal between said extension and said bore when said probe is extended on said thread, said seal means being arranged to break the seal in the bore when said probe is retracted, an annular piston slidingly engaged between said extension and the inside of said probe, a coil spring compressed between said piston and said stem and urging the piston outwardly in said probe, and a port formed in the wall of said extension from the hollow inside to outside thereof to open into said dose chamber at the outer side of said piston when said probe is extended on said thread, said stem extension being connected on the end of said stem by an axially slidable connection that locks against subsequent disconnection, and a flexible seal positioned within one of said stem elements to seal between the ends of said stem and said stem extension.

10. A pressurized medicament container with tiltable discharge valve and separate elongated dose measuring and dispensing probe connected to the stem of the valve comprising, a hollow stem on said valve extending from the inside to the outside of the container, a cap on said container forming an annular seat surrounding the outer end of said stem, a thread on the outer end of said stem, a hollow cylindrical probe and dose chamber having an end wall threadedly engaged with the thread on said stem, the inner end of said probe seating on said seat on said cap to prevent tilting of the stem and probe when the probe is threadingly retracted inwardly on said thread, the outer end of said probe defining a cylindrical bore with an outer end forming a discharge opening, a hollow cylindrical stem extension connected to the outer end of said stem and projecting into said bore in the end of said probe, means forming a seal between said extension and said bore when said probe is extended on said thread, said seal means being arranged to break the seal in the bore when said probe is retracted, an annular piston slidingly engaged between said extension and the inside of said probe, a coil spring compressed between said piston and said stem and urging the piston outwardly in said probe, and a port formed in the wall of said extension from the hollow inside to outside thereof to open into said dose chamber at the outer side of said piston when said probe is extended on said thread, said stem extension being connected on the end of said stem by an axially slidable connection, and a flexible seal positioned within one of said stem elements to seal between the ends of said stem and said stem extension.

References Cited in the file of this patent

UNITED STATES PATENTS

| | | |
|---|---|---|
| 2,763,406 | Countryman | Sept. 18, 1956 |
| 2,945,494 | Bowen | July 19, 1960 |
| 3,004,718 | Garman | Oct. 17, 1961 |